Sept. 30, 1969     L. F. SCHEXNAYDER     3,469,861
HYDRAULIC CONTROL CIRCUIT FOR PUSH-PULL
COUPLING OF TANDEM MACHINES
Filed Nov. 22, 1967

INVENTOR.
LAWRENCE F. SCHEXNAYDER

BY

ATTORNEYS

3,469,861
HYDRAULIC CONTROL CIRCUIT FOR PUSH-PULL COUPLING OF TANDEM MACHINES

Lawrence F. Schexnayder, Will County, Ill., assignor to Caterpillar Tractor Co., Peoria, Ill., a corporation of California
Filed Nov. 22, 1967, Ser. No. 685,155
Int. Cl. B60d 1/16, 3/00; F15b 15/00
U.S. Cl. 280—479                                     4 Claims

ABSTRACT OF THE DISCLOSURE

A hydraulic control circuit having a double-acting hydraulic jack for engaging and disengaging a bail on a rearward implement with relations to a hook on a forward implement to permit selective push-pull tandem operation thereof. A two-position valve selectively directs fluid under pressure to the head or rod end of the jack. A relief valve in communication with each end of the jack limits fluid pressure therein.

CROSS REFERENCE TO RELATED U.S. PATENTS

Figure 1:
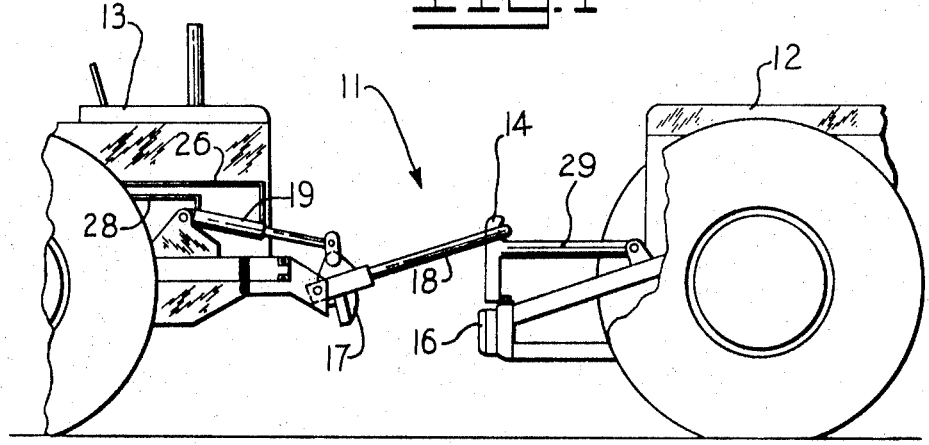

The present invention is particularly contemplated for employment in a push-pull coupling between earth moving scrapers as described in U.S. patent application Ser. No. 642,754, filed by Trevor G. Campbell, on June 1, 1967 and assigned to the assignee of the present invention.

The present invention generally provides a control circuit for a double-acting hydraulic motor. More particularly, it is contemplated for controlling a motor which positions a bail for quick engagement or disengagement of a push-pull coupling between earth moving scrapers. As disclosed by the above mentioned application, such a coupling permits very efficient operation of a pair of earth moving scrapers since their tractive power can be combined for separate loading of each scraper to eliminate the need for a separate pusher machine. The capability of quick engagement and disengagement permits individual maneuvering of the scrapers during transport, dump and return to tandem loading position so that time required for the operating cycle is minimized. In a preferred manner of operation, the two scrapers enter a borrow pit or loading area one behind the other. The rearward scraper pushes to assist in loading of the forward scraper. During this time, the operator of the rearward scraper lowers a latching means or bail into engagement with a hook on the forward scraper by means of a double acting hydraulic jack. When the forward scraper is loaded, it then pulls to assist in loading of the rearward scraper. When both scrapers are loaded, the bail is raised out of engagement with the hook and the two scrapers operate independently during unloading and return to the loading area.

To appreciate one particular problem overcome by the present control circuit, assume that the hydraulic jack which positions the bail is controlled by a conventional circuit. Fluid would be directed through a valve to operate the jack for engaging the bail with the hook. The valve would then be closed to isolate the jack and maintain engagement between the bail and hook. Since the scrapers travel over rough terrain, there is considerable relative vertical motion between them. Since the hook is fixed on the forward scraper and the bail is fixed on the rearward scraper by fluid isolation of its jack, great stresses are developed by interaction of the hook and latch. These stresses tend to result in damage or breakage of the mechanical or hydraulic components of the coupling.

Although the above coupling was designed to facilitate rapid engagement and disengagement between the scrapers it has been found that the novel control circuit of the present invention provides substantially increased efficiency of operation and decreased stress and breakage in the coupling as well as being otherwise advantageous.

Accordingly, it is a principal object of the present invention to provide a novel control circuit for double-acting motors employed in applications such as that described above.

A further object is to provide a control circuit for a double-acting hydraulic motor which controls engagement and disengagement of the coupling of the kind described above whereby positive engagement of the coupling may be achieved while relieving some of the stresses developed therein.

Another object is to provide such a control circuit to reduce manipulative duties of the operator and thereby further contribute to operating efficiency.

Figure 2:
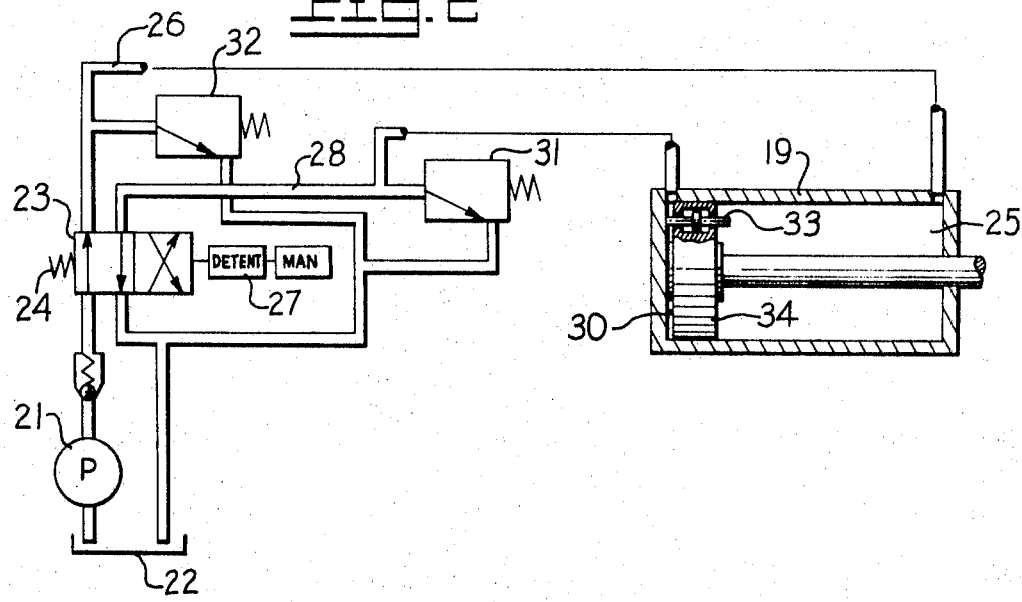

Other objects and advantages will be made apparent from the following description and the accompanying drawings wherein:

FIG. 1 is a side elevation of a push-pull coupling between tandem operating scrapers, only parts of which are shown; and FIG. 2 is a schematic illustration of a control circuit for a hydraulic jack which provides for quick engagement or disengagement of the coupling.

The control circuit of the present invention is described below with particular reference to a push-pull coupling which is hydraulically engaged and disengaged. However, it will be apparent that the control circuit may similarly be employed with a double acting hydraulic motor for positioning of a member in other applications where similar characteristics of operation are desired.

Having reference to FIG. 1, a push-pull coupling indicated at 11 provides for quick engagement and disengagement of a forward scraper 12 and a rearward scraper 13 as discussed above. The forward scraper has a rearwardly disposed hook 14 and push pad 16. The rearward scraper has a push block 17 for engagement with the pad 16 when the rearward scraper pushers the forward scraper. The rearward scraper also has a pivotal bail 18 which is lowered into engagement with the hook 14 to permit pulling by the forward scraper. The bail is raised for disengagement from the hook to permit independent operation of the scrapers. A double-acting hydraulic jack 19 is associated with the bail on the rearward scraper and is remotely operable by the operator of the rearward scraper through the control circuit described below. Extension of the jack lowers the bail for engagement with the hook and retraction of the jack raises the bail for disengagement. A more detailed description of the push-pull coupling and its operation for permitting selective tandem operation of the two scrapers is set forth in the above mentioned Campbell et al. patent application.

The hydraulic circuit by which the operator controls the jack 19 is illustrated in FIG. 2 and has a pump 21 for delivering fluid under pressure from a sump 22. A two-position valve 23 receives fluid from the pump and is normally urged into one of its positions by a spring 24 so that it directs fluid through a conduit 26 to the rod end 25 of the jack 19. Referring momentarily to FIG. 1, this normal positioning of the valve tends to raise the bail to its disengaged position. To lower the bail for engagement with the hook (see FIG. 1), the valve 23 is shifted to its second position where it is retained by detent means 27. In this position, the valve directs fluid from the pump to the head end 30 of the jacks 19 through a conduit 28.

As noted above, the bail is lowered for engagement with the hook preferably during the period in which the rearward scraper is pushing the forward scraper. The detent mechanism permits the operator to initially position the valve for engagement of the bail with the hook and then direct his attention completely to operation of the scraper. Then, as the forward scraper is loaded and the rearward scraper commences loading, the speed of the rearward scraper is decreased relative to the forward scraper so that the bail, riding on structure 29 of the forward scraper, engages the hook 14 and permits the forward scraper to pull the rearward scraper. During this entire push-pull operation, it is desirable that the bail be positively positioned against the structure 29 to insure suitable engagement with the hook 14. On the other hand, fixing the position of the bail against the supporting structure 29 tends to cause damage within the coupling due to the interaction of the bail and the structure 29 during relative vertical oscillation of the two scrapers. To maintain the bail in positive relation with the hook structure while permitting it to yield in response to relative vertical motion of the scrapers, a relief valve 31 is provided to relieve excess fluid pressure from the conduit 28 and thus the head end of the jack 19. The relief valve 31 vents that excess fluid pressure back to the sump 22. It may thus be seen that the valve 23 in its detent position in combination with the relief valve 31 provides positive positioning of the bail for engagement with the hook while preventing damage within the coupling. With the two-position valve in its detent position, fluid under pressure from the pump 21 is continually directed to the head end of the jack so that the bail is urged downwardly against the supporting structure in front of the hook. At the same time, the relief valve 31 which is associated with the head end of the jack performs at least two functions. Firstly, it vents excess fluid from the pump to limit the force with which the bail is urged downwardly by the jack. Secondly, as the forward scraper is in upward motion relative to the rearward scraper causing the hook structure to act upwardly against the bail, the relief valve 31 vents excess fluid pressure from the head end of the jack to prevent damage to the coupling.

As the rearward scraper completes loading, the operator releases the two-position valve from its detent position so that the valve, under influence of the spring 24, communicates the pump with conduit 26 and the rod end of the jack. To provide for suitable operation of the bail during this period as well as when it is fully raised to its disengaged position, another relief valve 32 is provided to vent excess pressure from the conduit 26 and thus the rod end of the jack 19, the relief valve 32 returning that excess fluid pressure to the sump 22. The relief valve 32, which is associated with the rod end of the jack, in combination with the control valve 23 in its normal position, performs at least two important functions. Firstly, when the operator observes that the rearward scraper is nearly loaded but is still being pulled by the forward scraper, the operator releases the control valve from its detent position. The pump then continuously directs fluid through the valve 23 to the rod end of the jack tending to raise the bail for disengagement from the hook. However, because of the pulling relation between the two scrapers, considerable tension exists between the hook and the bail which resists raising of the bail. To eliminate the need for the operator directing his attention towards the control valve until this tension is reduced, the relief valve 32 vents excess pressure, arising in response to the tension, from the conduits 26 and the rod end of the jack. As the rearward scraper completes loading and raises its bowl, its speed tends to increase relative to the forward scraper so that tension in the coupling is reduced, permitting fluid from the pump to retract the jack and raise the bail to its disengaged position. Additionally, it is apparent with reference to FIG. 1 that if hydraulic leakage were to permit the bail to be lowered from its disengaged position while the scrapers are operating independently, the bail could interfere with subsequent pushing engagement between the scrapers or even nose into the ground to result in substantial damage to the coupling portion of the rearward scraper. To positively maintain the bail in its disengaged position when desired, the normally positioned valve 23 permits the pump to continuously direct fluid to the rod end of the jack with the bypass valve 33 venting fluid from the pump back to drain.

When either of the relief valves 31 or 32 is required to vent substantial fluid back to drain, restricted passage of that fluid across the relief valve may tend to generate undesirable heat and shorten its operating life. To minimize this tendency, a two-way bypass valve 33 is positioned in the piston 34 of the jack to control fluid communication between its rod end and its head end. When the jack is operating in extension or retraction with its piston out of adjacent relation to either end of the jack, the bypass valve is automatically positioned by fluid pressure in the jack to prevent fluid communication thereacross. However, when the piston 34 of the jack approaches either end of the jack cylinder, the bypass valve 33 is opened to permit communication between the two chambers of the jacks. Thus, continuous fluid flow from the pump to the jack, for example, to its rod end as shown in FIG. 2, is vented at a reduced pressure to the sump 22 by means of the bypass valve 33, the jack head chamber and the conduit 28. Enough pressure is developed by line restrictions to maintain the bail in a raised position once it has been disengaged from the hook 14. The bypass valve functions similarly when the jack is in its fully extended position. However, in either mode, pressure in the jack is regulated by one of the relief valves 31 and 32. The pressure setting of the two relief valves is selected for proper operation of the coupling. For example, the setting of the relief valve 31 limits the amount of force which may result from interaction between the bail and the hook structure. In the present embodiment, an exemplary setting for this relief valve is approximately 300 p.s.i. On the other hand, the pressure setting of the relief valve 32 is the means by which the bail is disengaged. Accordingly, to insure that the bail is positively disengaged, the pressure setting of the relief valve 32 is substantially higher, for example, approximately 600 p.s.i.

Thus, a control circuit for the bail is disclosed which permits proper functioning of the coupling, reduces stresses and possible breakage in the coupling and also minimizes the attention which the operator of the rearward scraper must pay to the coupling so that he may more fully direct his attention to operation of the scraper and thus increase operating efficiency.

I claim:

1. A hydraulic circuit for operating a coupling between two vehicles, the coupling providing for push-pull tandem operation thereof, the coupling including hook means on one vehicle and a latch member disposed on the other vehicle, the latch member being movable between two positions of engaged and disengaged relation with the hook means comprising:

a double-acting hydraulic motor for positioning the latch member and positively maintaining the latch member in each of its two positions, a source of fluid under pressure, valve means having two positions for directing fluid from said source to said motor and causing said motor to properly position the latch member in each of its two positions, and relief means associated with said motor for limiting maximum pressure of fluid therein, said relief means permitting the motor to positively position the latch member in engagement with the hook to insure coupling of the vehicles and to yield to excessive force exerted upon the motor by interaction of the latch member and hook means due to relative motion of the vehicles.

2. The combination of claim 1 wherein the motor has a bypass valve operable with the latch member in one of its two positions according to the motor to provide venting of the hydraulic fluid from the motor for reduction of the amount of fluid to pass across the relief means.

3. The combination of claim 1 wherein the motor has opposing fluid chambers respectively communicated with said two-position valve by two fluid conduits, said relief means comprising two relief valves in respective communication with the conduits, said two-position valve tending into one of its positions to direct fluid through one of the conduits to one of the motor chambers to engage the latch member with the hook, said two-position valve having detent means for holding it in its other position to direct fluid through the other conduit to the other motor chamber for disengagement of the latch member from the hook, the relief valve of the other conduit preventing disengagement while substantial tension exists across the coupling.

4. The combination of claim 3 wherein the motor has bypass valve means for providing fluid communication between the two fluid chambers therein when the latch is positioned in its disengaged position by the motor.

References Cited
UNITED STATES PATENTS

| | | | |
|---|---|---|---|
| 2,270,943 | 1/1942 | Freundel et al. | 91—412 |
| 2,529,159 | 11/1950 | Hyler | 280—479 |
| 2,543,989 | 3/1951 | Rockwell. | |
| 2,587,208 | 2/1952 | Peterson | 280—481 X |
| 2,902,007 | 9/1959 | Rockwell. | |
| 2,741,895 | 4/1956 | Horvath | 91—464 X |
| 3,068,596 | 12/1962 | Hein et al. | 37—129 |
| 3,127,688 | 4/1964 | Hein et al. | 37—129 |

LEO FRIAGLIA, Primary Examiner

U.S. Cl. X.R.

37—129; 60—52; 91—401; 280—481, 491